UNITED STATES PATENT OFFICE.

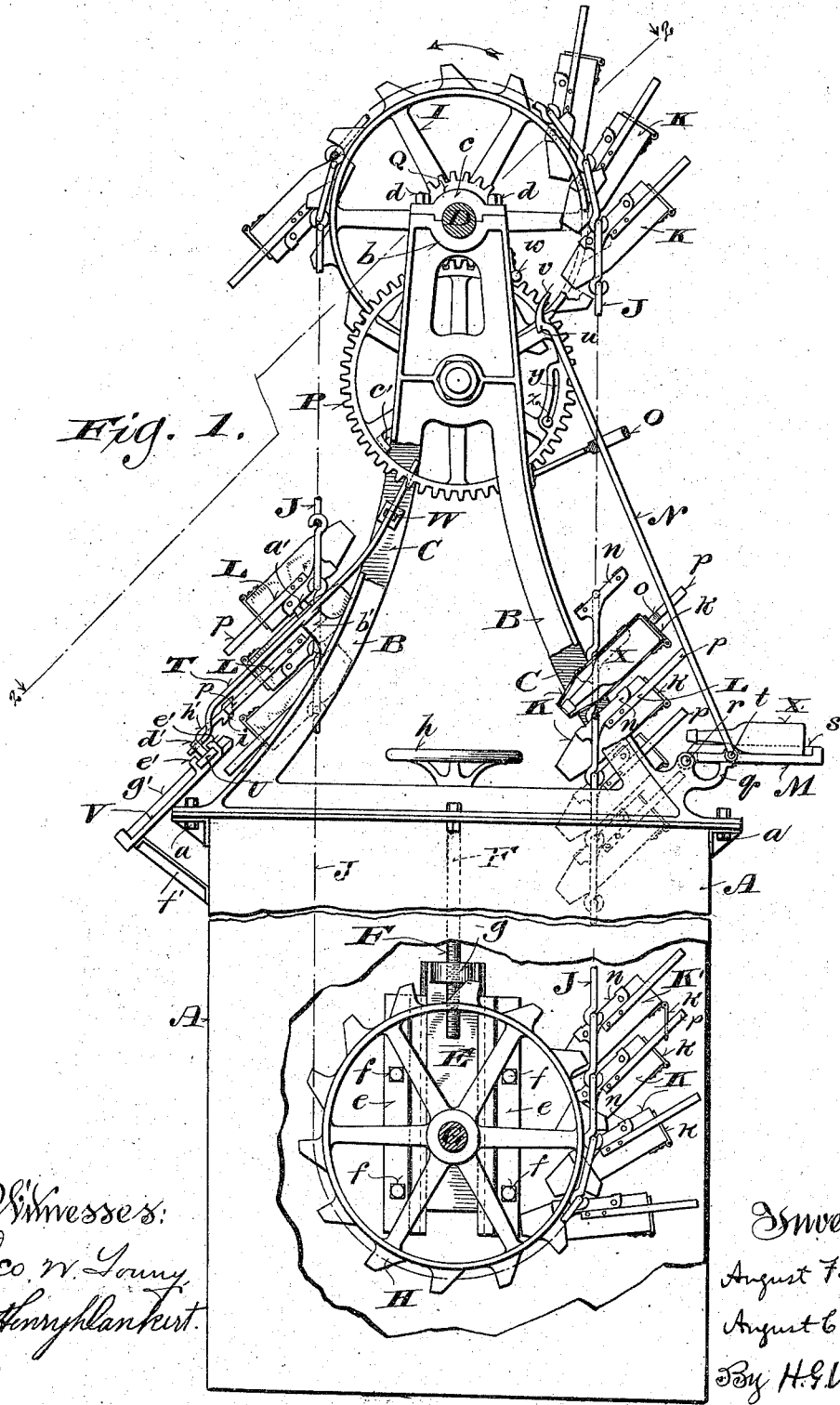

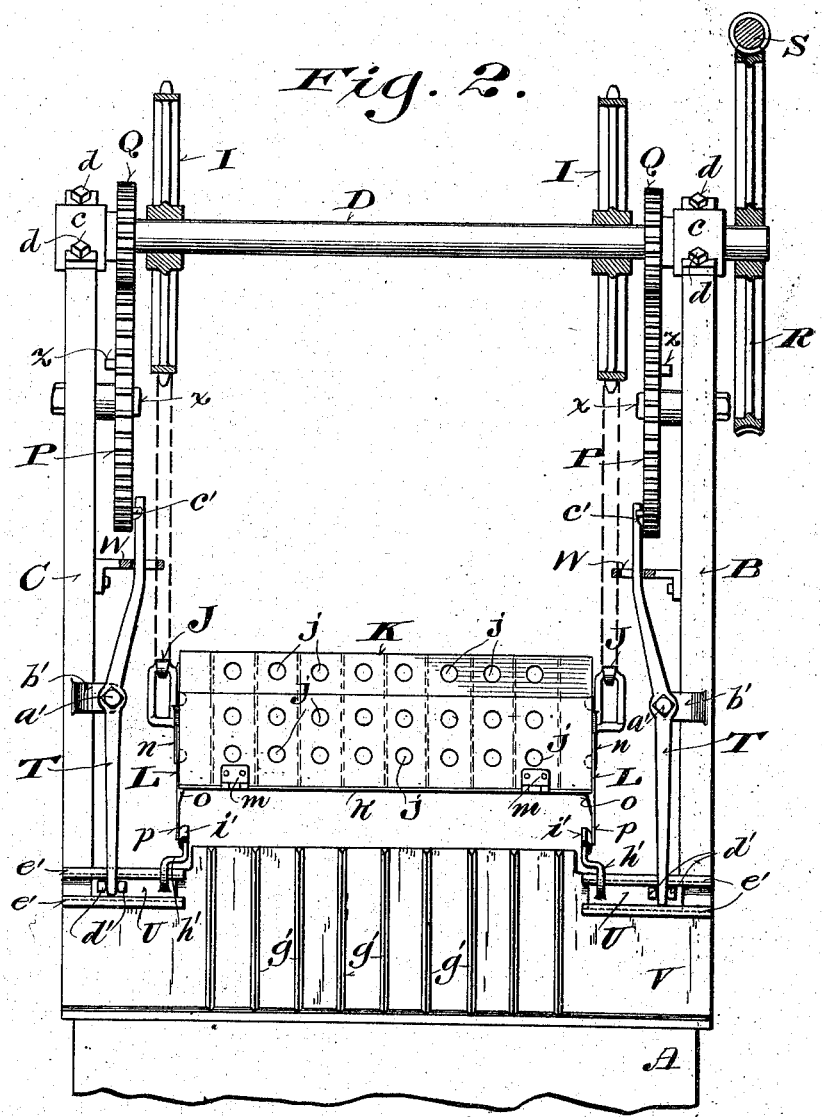

AUGUST F. DUMKE AND AUGUST C. DUMKE, OF MILWAUKEE, WISCONSIN.

BOTTLE-WASHER.

SPECIFICATION forming part of Letters Patent No. 530,583, dated December 11, 1894.

Application filed September 27, 1894. Serial No. 524,249. (No model.)

*To all whom it may concern:*

Be it known that we, AUGUST F. DUMKE and AUGUST C. DUMKE, citizens of the United States, and residents of Milwaukee, in the county of Milwaukee and State of Wisconsin, have invented certain new and useful Improvements in Bottle-Washing Machines; and we do hereby declare that the following is a full, clear, and exact description thereof.

Our invention relates to bottle washing machines, and consists in certain peculiarities of construction and combinations of parts, as will be fully set forth hereinafter and subsequently claimed.

In the drawings, Figure 1 is an end elevation of our device, partially broken away and with portions thereof removed to better illustrate details of construction. Fig. 2 is a detail side elevation of the upper part thereof, partly in section on the line 2—2 of Fig. 1, and also with portions removed. Fig. 3 is a top plan view of one of the bottle holding buckets with its hinged door removed.

Referring to the drawings, A represents a tank or well for containing water, the greater portion of said tank being preferably located below the floor line of the operating room.

B C represent the end pieces of a frame supported upon and secured to the top of this tank, as shown at $a\ a$. The top of each end piece B and C is formed with a bearing, $b$, to receive a shaft D, secured in place thereon by suitable caps $c$, and screw bolts $d$.

In the lower part of the tank A are arranged two pairs of vertical guides $e\ e$, bolted to the inner surface of the walls of said tank as shown at $f\ f$, only one of these pairs of guides being shown in Fig. 1, together with the slide E, vertically movable in said guides, part of one wall of the tank with its attached guides and the adjacent slide being broken away. At the upper end of each slide is a lug $g$, having a screw-threaded perforation therethrough, to receive a vertically movable screw-rod F controlled by a hand-wheel $h$.

G is a shaft journaled loosely in the said vertical slides E, and fast on this shaft are two sprocket-wheels H, and as these are exactly in line with each other, only one of these sprocket-wheels H shows in Fig. 1, this wheel hiding the wheel that is adjacent to the guides and slide shown in said figure.

I I represent a pair of similar sprocket-wheels fast on the upper shaft D, and J J designate sprocket-chains connecting the upper and lower pairs of sprocket-wheels.

The described arrangement of guides, slides and screw-rods constitute chain-tightening devices, and in Fig. 1, the hand-wheel $h$ shown hides the other hand-wheel appertaining to the screw-rod F shown in full lines in said figure.

K K K designate the bottle receiving and carrying buckets, one of which is secured to each pair of corresponding links of the two chains, said buckets extending transversely from one chain to the other, and being formed with transverse partitions $i\ i\ i$ to form a series of compartments, so that a series of bottles can be carried at one time. These buckets are further provided with perforations $j\ j\ j$, as shown in Figs. 2 and 3, and with doors $k$, hinged to the buckets as shown at $m\ m$, one door closing all the partitioned spaces of an entire bucket. Each link of the sprocket-chains J is provided with an angularly-projecting flat plate, $n$, which is riveted to the adjacent end of a bucket and at each end, next to this plate, each bucket is provided with a spring locking latch L having a catch or lug $o$ projecting inward to keep the doors $k$ closed, and a projecting end $p$ to serve as a trip or release, at the proper moment, when it is desired to permit said doors to open.

Projecting from one side of the end pieces B and C are brackets $q$ to which is pivoted, as shown at $r$, a feeding table M, the said table being preferably provided with transverse partition strips $s$ which should correspond in number and location to the described partitions $i$ of the buckets K.

N (Fig. 1) is one of a pair of lifting arms, pivoted at its lower end, as shown at $t$, to the table M, and having a hook $n$, at its upper end, terminating in a curved trip $v$.

O is a slotted guide, projecting from the end piece B, the lifting arm N passing through the slot in said guide, as shown, and $w$ is a rounded tripping lug on the upper part of the said end-piece B. The end-piece C, is provided, on this same side, with the duplicates of these attachments, for engagement with a similar lifting arm N, similarly pivoted to the other end of the table M, but necessarily concealed from view in the end elevation, Fig. 1.

Projecting inwardly from the end-pieces B and C, are studs $x$ $x$, on which are supported gear-wheels P P which mesh with pinions Q Q fast on the power shaft D, above. One end of this power shaft extends beyond the adjacent end-piece B of the frame and carries a worm-gear-wheel R to which motion from any suitable source of power is transmitted by means of a worm-shaft S, the said source of power and ordinary connections not being shown. The gear-wheels P are formed with an arc-slot $y$ therein, within which slot is adjustably secured a pin $z$ projecting outwardly from said gear-wheel for engagement with the hook $u$ of the lifting-arm N, as hereinafter described.

T T represent levers centrally pivoted as shown at $a'$ to brackets or lugs $b'$ on the end pieces B C. The upper ends of said levers T are designed for engagement with beveled or inclined cams $c'$ on the inner faces of the described gear-wheels P P, while the lower ends of said levers rest between lugs $d'$ $d'$ on horizontal slides U U, which in turn move in guide-ways $e'$ $e'$ on the ends of the receiving table V, the latter being supported by braces or brackets $f'$ on the opposite side of the tank A from the feeding table M, and similarly provided with transverse partition strips $g'$ $g'$. The described slides U are provided with upward projecting arms $h'$ terminating in convex-faced tripping disks $i'$ for engagement with the described projecting ends $p$ of the locking-latches L. The upper ends of the levers T are prevented from moving too far, in either direction, by means of slotted guides W, the said ends passing through the said slots of the guides, which latter are secured to the end-pieces B and C, as best shown in Fig. 2.

The operation of our device will be readily understood from the foregoing description of its construction taken in connection with the accompanying drawings.

It must be understood that the size of the gear-wheels and pinions and the number of teeth thereon are to be proportioned according to the size and height of the elevator and the number of buckets employed, so as to predetermine the speed of the device, and consequent length of time that the said buckets will remain immersed in the water, and the number of times that each bucket will be filled and emptied before its contents are finally ejected upon the receiving table V, and as this is a matter that may be varied indefinitely according to circumstances, we do not wish to limit ourselves to any exact matters of number or proportion; but as a matter of illustration, let us suppose that the sprocket-wheels have eighteen teeth, and the distance between centers is fifteen feet, with every link of the chains five inches in length. This would give the elevator ninety buckets. The worm-wheel R will be supposed to have one hundred teeth, and the worm-shaft to make one hundred revolutions every minute, which would make the sprocket-wheels make one revolution each minute, and the chains with buckets attached one revolution every five minutes. Suppose the pinions Q had thirty-six teeth and the gear-wheels P ninety-two teeth, that would open every forty-sixth bucket, by the described mechanism. If the gear wheels P had each ninety teeth, they would open two buckets in every revolution of the chains, but it would be the same buckets every time. Now, by having ninety-two teeth, instead of ninety, with each time that a bucket is opened to discharge the bottles therein contained it will be the next following bucket to that last opened, and therefore, with the proportions and figures given in the foregoing example, every bottle in the elevator will remain in place for three hours and fifty minutes, and will be filled with water and emptied forty-six times, thus insuring a very thorough cleansing, and the same is true whenever substantially the same relative proportions are employed, it being always essential to arrange the device, so that, each time, the succeeding bucket to that last emptied shall be operated upon at the receiving table.

In filling a bucket (for illustration, the bucket marked K', in Fig. 1, which is the last bucket that had been emptied and which is shown with its door $k$ hanging open) when the chains have brought this bucket just up to the line of the feeding-table M, the partial revolution of the gear-wheels P has brought the pins $z$ up under the hooks $u$ near the upper ends of the lifting arms N, and as the wheels P continue to revolve, the said arms N raise the table M, and the bottles X therein slide by gravity into the partitioned chambers in said bucket, and as the wheels P turn, the curved trips $v$ on the extreme upper ends of the lifting arms N next come in contact with the rounded tripping lugs $w$ on the end-pieces B and C, which serves to force said arms outward and free their hooks $u$ from engagement with the described pins $z$ on said wheels P, when the feeding table M at once drops by gravity to its former place, the guides O preventing said arms N from falling too far outward. The operator then closes the door $k$ of this bucket K' (the locking latches L yielding to receive the door and hold it closed) and places a fresh supply of bottles X upon the table to fill the next emptied bucket. When the gear-wheels P in their continued revolution, have reached the point where the beveled or inclined cam-lugs $c'$ upon their inner surfaces are against the levers T the said cam-lugs force the upper ends of said levers inward, or toward each other, and the lower ends of said levers are thereby forced outwardly, drawing the slides U with them, and consequently forcing the tripping disks $i'$ of the arms $h'$ of said slides against the projecting ends p of the locking-latches L on the bucket which is adjacent to the receiving table V at this time, which action withdraws the catches or lugs o on the latches L from beneath the door k of this bucket and permits the said door to swing open by gravity and allow the bottles in said bucket to slide out upon the receiving table V.

Having thus described our invention, what we claim as new, and desire to secure by Letters Patent, is—

1. In a bottle-washing machine, the combination of a tank or well, a suitable supporting frame, an elevator comprising sprocket-wheels mounted in the frame and a pair of sprocket-chains the links of the latter being connected by transverse bottle-holding buckets, mechanism for automatically opening the doors of said buckets and emptying them of said bottles, other mechanism for automatically feeding bottles into said buckets, and operating gearing relatively proportioned to cause said buckets to open successively after a predetermined number of revolutions, substantially as set forth.

2. In a bottle-washing machine the combination with a tank or well, a suitable supporting frame and an elevator comprising suitable shafts, pinions, sprocket-wheels, and a pair of sprocket-chains the links of the latter being connected by transverse bottle-holding buckets, of a bottle-feeding table pivoted to said frame, gear wheels in mesh with the pinions on the upper shaft of the said elevator, pins on said gear wheels, lifting arms pivoted to said feeding table, and provided with hooks for engagement with said pins, and terminating in curved trips, and tripping lugs on said frame for engagement with said trips, substantially as set forth.

3. In a bottle-washing machine, the combination with a tank or well, a suitable supporting frame, and an elevator comprising suitable shafts, pinions, sprocket-wheels and a pair of sprocket-chains the links of the latter being connected by transverse bottle-holding buckets, of a bottle-receiving table secured to said frame, gear-wheels in mesh with the pinions on the upper shaft of the said elevator, beveled or inclined cam-lugs on said gear-wheels, hinged doors and spring locking latches on said buckets, slides on said receiving table, provided with tripping arms in engagement with said latches, and levers pivoted to said frame, one end of each lever projecting in the path of one of the said cam-lugs on the gear-wheels and the other end of each lever being in engagement with one of said slides on the said receiving table, substantially as set forth.

In testimony that we claim the foregoing we have hereunto set our hands, at Milwaukee, in the county of Milwaukee and State of Wisconsin, in the presence of two witnesses.

AUGUST F. DUMKE.
A. C. DUMKE.

Witnesses:
H. G. UNDERWOOD,
N. E. OLIPHANT.